Nov. 7, 1967  J. W. ANDERSON  3,350,738
WINDSHIELD WIPER BLADE ASSEMBLY
Filed Dec. 23, 1964                           2 Sheets-Sheet 1
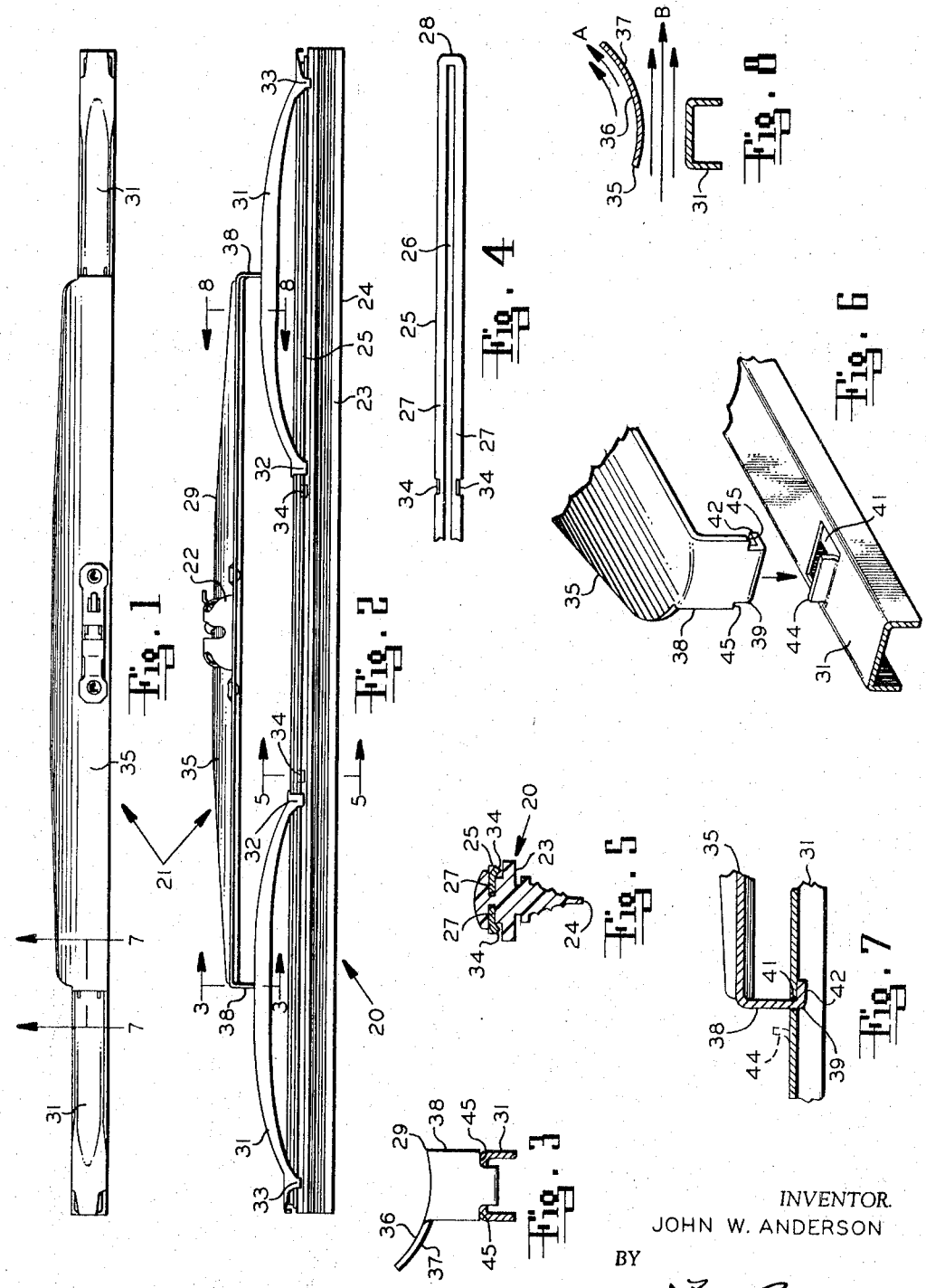
INVENTOR.
JOHN W. ANDERSON
BY
ATTORNEY

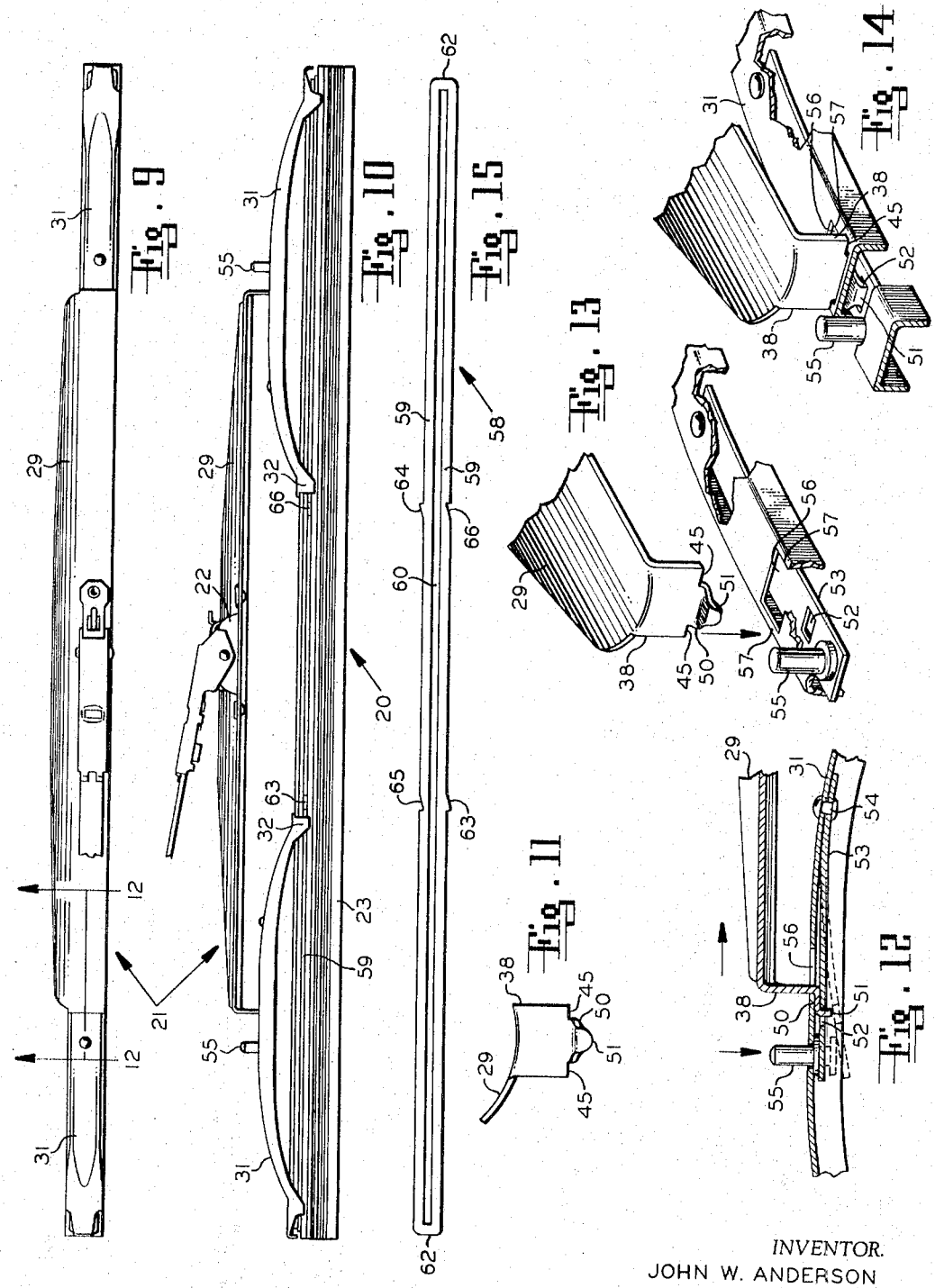

United States Patent Office 3,350,738
Patented Nov. 7, 1967

3,350,738
WINDSHIELD WIPER BLADE ASSEMBLY
John W. Anderson, 405 S. Huntington St.,
Gary, Ind. 46403
Filed Dec. 23, 1964, Ser. No. 420,632
11 Claims. (Cl. 15—250.42)

This invention relates generally to windshield wipers and is particularly concerned with windshield wipers that minimize or overcome the effect known as "windlift" and with wiper blades having replaceable wiping elements.

In a check of vision obstructions on vehicles involved in traffic accidents, the National Safety Council has reported that 45% of all such accidents involve visibility obscurements such as rain, snow, etc., on the windshield—and that such obscurements account for 37% of deaths in such accidents.

The function of a wiper blade, of course, is to remove such obscurements with sufficient consistency to provide driving vision adequate to enable the driver to protect himself and his passengers, and drivers and passengers of adjacent vehicles in traffic, against car damage, personal injury and/or death.

Driving speeds generally practiced on modern multi-lane highways frequently subject the windshield to critically severe impact of air currents reflecting air speeds constituted by the composite of the natural speed of the wind and the forward speed of the car. Thus, as an example, a car encountering a natural wind traveling at 35 miles per hour, when the car speed is a lawful 65 miles per hour, creates against the windshield a composite air speed of 100 miles per hour—which is of hurricane velocity.

Air moving relative to the windshield may act on the windshield wiper structure so as to cause partial or total lifting of the wiping edge from the windshield (i.e., "windlift") consequent partial or total loss of wiping action.

Due to the wide and increasing prevalence of highways permitting such higher rate of travel, wiper blades that provide no effective aerodynamic resistance against windlift from the glass under such composite air pressures thus leave the driver with obscured vision dangerous to him and to others in traffic. Persistent increases in sales of anti-windlift blades, now widely available, reflect increasing public consciousness of the serious need for change to wiper blades having aerodynamic characteristics adequate to keep them in contact with the windshield and keep them providing adequate driving vision under composite speeds of air against the windshield greatly exceeding those speeds with which windshield wipers still constituting a substantial majority of all those in use were designed to cope.

European car manufacturers, likewise confronted with such intensifying problems, have recently adopted for installation as original equipment on motor vehicles produced by them an anti-windlift wiper blade substantially identical to anti-windlift wiper blades being manufactured in increasing quantities for replacement purposes and sold by wholesalers and retailers in the United States and Canada.

Insurance Information Institute reports that in a single recent year—40,900 persons died in U.S. traffic accidents—in which also 3,345,000 suffered personal injuries—more than twice as many casualties as in our armed services during all the years of World War I and World War II.

It has been established through competent engineers of car manufacturers that the adoption of curved windshields was delayed pending the availability of a windshield wiper blade that would wipe them successfully. Likewise, the capacity of anti-windlift wiper blades to increase their contributions to traffic security will be enhanced by incorporation of the improvements in windshield wiper assemblies herein shown and claimed.

In the meantime, vehicle manufacturers have attempted during recent years to minimize windlift by the doubtful expedient of excessive increases in the amount of wiper arm pressure applied to wiper blades used as original equipment. A formerly accepted standard of such pressure (equal to "at least one ounce per inch of blade length") has become inadequate for conventional blades lacking satisfactory aerodynamic characteristics.

Such substantial increases in arm pressure require heavier and more costly wiper arms, heavier pivot assemblies, heavier transmission assemblies and heavier motors—all of which adds up to a punishing extra cost to the car manufacturer, which cost of course is to be passed on to the purchaser and user of the car.

The above described condition has increased hardships and hazards imposed on the public generally and has intensified already serious impediments and hazards in traffic.

An object of the invention is to provide—in an articulated assembly—an improved airfoil member and connection therefor adapted to transmit pressure through one or more secondary members to predetermined spaced-apart positions on the wiping element.

Among other objects of the invention are (a) a reduction in the cost of production of the complete assembly, (b) a novel design and disposition of an airfoil element to receive pressure from the windshield wiper arm and transmit that pressure as stated, (c) improvement in the aerodynamic characteristics of the airfoil element of the assembly.

A further object of the invention is to provide a windshield wiper member consisting of a resilient rubber wiping element supported by a flexor or improved design, constituting a readily replaceable assembly that can be produced at less cost for material and labor and with substantially reduced cost of upkeep of dies required for its production.

Other objects of the invention will be apparent from the specifications and drawings submitted as a part hereof.

In the drawings:

FIGURE 1 is a top view of a windshield wiper blade embodying the present invention;

FIGURE 2 is a side view of the blade of FIGURE 1;

FIGURE 3 is a cross-sectional view of a portion of the pressure-distributing assembly of the blade of FIGURE 2 taken along the line 3—3;

FIGURE 4 is a partial top view of the flexible support member of the wiper blade element;

FIGURE 5 is a cross-sectional view of the wiper blade element of FIGURE 2 taken along the line 5—5;

FIGURE 6 is an enlarged isometric view of the end of the upper member of the pressure-distributing assembly and the middle of the underlying member of the pressure-distributing assembly, showing a step in the method of assembling these members;

FIGURE 7 is a cross-sectional view of the members shown in FIGURE 6 taken along the line 7—7 of FIGURE 1, showing these members as assembled.

FIGURE 8 is a cross-sectional view of the members shown in FIGURES 6 and 7 taken along the line 8—8 of FIGURE 2;

FIGURE 9 is the top view of a wiper blade embodying another feature of the present invention;

FIGURE 10 is a side view of the blade of FIGURE 9;

FIGURE 11 is an enlarged end view of the upper member of the pressure-distributing assembly of the blade shown in FIGURES 9 and 10;

FIGURE 12 is an enlarged cross-sectional view of the end of the upper member of the pressure-distributing assembly of the blade shown in FIGURES 9 and 10 and the middle of the member to which the upper member is detachably connected, the dotted lines showing the method of detaching the upper member;

FIGURE 13 is an isometric view, with parts broken away, of the members in FIGURE 12, showing a step in the method of connecting these members;

FIGURE 14 is an isometric view of the members of FIGURES 12 and 13, with parts broken away, showing these members as assembled; and FIGURE 15 is a top view of another form of the flexor.

The windshield wiper exemplified in FIGURES 1 to 8, inclusive, comprises a windshield wiper assembly, referred to commercially as a wiper blade, comprising a wiper blade element indicated generally at 20 and an articulated pressure-distributing assembly, means or super structure, indicated generally at 21, which receives pressure from a wiper arm (not shown) attached to connector 22 and which then distributes (i.e. transmits and proportions) such pressure to a plurality of positions, spaced locations or longitudinal points along the length of blade element 20. Blade element 20 is conformable to both flat and curved surfaces and, when urged towards the windshield by the pressure distributed by the pressure-distributing assembly 20, automatically follows surfaces of varying curvatures, such as those involved in wiping modern curved windshields.

Wiper blade element 20 comprises two parts, a resilient member 23, which has a wiping edge, lip or portion 24, made of rubber or other elastomeric material, and a flexible support member or flexor 25, made of resiliently flexible metal of suitable thickness. As shown in FIGURE 4, flexor 25 is made of a single strip of metal of constant width which is die-cut or formed to have a long narrow aperture or slot 26 extending slightly less than the full length of the member, thus forming two side rails or portions 27 joined at both ends by integral U-shaped bridges or end portions 28. As can be seen in FIGURE 5, side rails or portions 27 are placed in grooves in the head of resilient wiping member 23.

The pressure-distributing assembly 21 comprises primary or upper pressure-distributing means, elongate member, bridge, lever, yoke or link 29 which receives the pressure imposed by the wiper arm through connector 22 and distributes this pressure to secondary or supplementary pressure-distributing means, elongate members, bridges, levers, yokes or links 31 positioned below member 29, each of which in turn transmit pressure from the ends 32 and 33 thereof to a plurality of positions along blade element 20, as can be seen in FIGURE 2. The ends 32 and 33 of secondary or lower pressure-distributing members 18 are in the form of claws or equivalent structures or arrangements which transmit pressure to flexor 25, keep the articulated pressure-distributing assembly 21 in operative association with blade element 20, at least some of which claws slide with respect to flexor 25 so that the blade element 20 can freely change its effective length as the blade moves across various curvatures of a windshield. At positions adjacent and inwardly of the claws at the inner ends 32 of the lower members 31, pairs of spaced cuts in opposite edges of the flexor 25 define small portions or flaps 34 which are turned down to form detents or shoulders in abutting relation to the claws at the respective inner ends 32 of lower members 31 and thus constitute means preventing the pressure-distributing assembly 21 from being longitudinally moved or slid off flexor 25 in either direction. The cuts forming the flaps 34 weaken the flexor locally and thus divide the flexor into a plurality of sections connected by weakened portions of increased flexibility so as to facilitate conformation of the blade element to a curved windshield.

Upper member 29 has an elongate portion or part 35 which extends longitudinally from approximately the middle of one lower member 31 to the middle of the other lower member 31. Elongate portion 35 has an upper surface 36 which is concave in a direction away from the windshield and a lower surface 37 which is convex toward the windshield (see FIGURE 8). Upper member 29 has approximately the form or shape of an elongate section of the surface of a right-angled cylinder and can be fabricated by impressing such a form on a strip of metal, as by die-forming or otherwise shaping the strip of metal. The end portions of the strip of metal are turned down and shaped to constitute spacer means or element 38 and means for securing pivotal connection between members 29 and 31, as explained below. Because the elongate portion 35 of upper member 29 has an arcuate upper surface 36 inclined obliquely to air passing in a lateral direction (i. e., transverse to the longitudinal axis of the wiper blade), it acts as an airfoil and deflects lateral air currents upwardly, as is indicated by arrows A in FIGURE 8, with the resultant creation of aerodynamic pressure downwardly toward the windshield. Since the arcuate lower surface 37 of element 35 extends progressively upwardly in a rearward direction, air currents passing thereunder, as indicated by arrows B in FIGURE 8, create a vacuum at the rear of member 35, thus affording additional aerodynamic pressure downwardly toward the windshield.

As stated above, the end portions of upper member 29 are, during the forming process, turned downwardly to form a spacer means, element or portion 38. Beyond spacer means 38 the extremities of member 29 are die-cut or otherwise shaped to provide a tab, projection or tongue 29, or reduced width, which extends through a slot 41 in member 31. Withdrawal of the end of member 29 from slot 41 is prevented by a horizontal portion or base 42 of tongue 39 formed by turning inwardly (i. e., toward the other end of member 29) the end of tongue 39. Prior to assembly of members 29 and 31, tab, projection or tongue 44 of member 31 is turned upwardly (as shown in FIGURE 6 and by the dashed lines in FIGURE 7). When tab 44 is turned up, slot 41 is enlarged to form an aperture in which the end of member 29 is placed (see FIGURE 6). After shoulders 45 are in engagement with the top edges of slot 41, as shown in FIGURE 3, tab 44 is turned downwardly to the position shown in FIGURE 7 so that the size of original aperture is reduced, forming slot 41 through which tongue 39 projects downwardly, with the edge of tab 44 forming one wall of the slot. The described construction is shaped and dimensioned so that there is play or clearance between the various parts for lower member 31 to move or rock vertically with respect to upper member 29. Accordingly, these members are in pivotal relationship with each other.

Spacer means 38 is flat and planar and is positioned or disposed so that the plane of its flat surface is perpendicular to the longitudinal axis of the blade and to the vertical plane passing through said axis. Because spacer 38 presents only an edge to air moving laterally or perpendicularly to the longitudinal axis of the blade, it offers minimal aerodynamic resistance to such currents. Because it has maximal area in a direction transverse to such currents it causes or promotes straight line or laminar flow of transverse air currents in the region below the end of the airfoil rather than turbulent flow, thereby increasing aerodynamic efficiency in this region and thereby tending to increase the total aerodynamic pressure toward the windshield. Such increase in aerodynamic pressure increases the effectiveness of the structure in resisting wind-lift. Additionally, spacer 38 spaces the lower surface of that portion of the airfoil which overlies the inner half of the lower member 31 a substantial distance apart and above the upper surface of lower member 31, so that there is an unobstructed space or opening of substantial area below the airfoil, thereby permitting free, nonturbulent movement of air in this region. The pressure-distributing assembly is shaped and dimensioned so that, during normal operation, the top of the inner half of lower member 31 does not move upwardly far enough to substantially diminish this space. All this permits highly efficient utilization of outer portions of the airfoil in the creation of aerodynamic pressure exerted downwardly to resist windlift.

In FIGURES 9 through 14 inclusive, those parts, elements or members that are of similar or identical construction and have similar or identical functions to parts, elements or members shown in FIGURES 1 through 8, have been given numbers identical to those of the corresponding parts, elements or members in the first described embodiment. It will therefore be understood that the description of such parts, elements or members in connection with the embodiment of FIGURES 1 through 8 applies to identical numbered parts, elements or members shown in FIGURES 9 through 14 and therefore need not be repeated.

As shown in FIGURES 12 and 13, a portion of upper member 29 adjacent the end thereof is turned down to provide spacer 38 with shoulders 45. Projecting outwardly therefrom (i.e., in a direction away from the other end of member 29) is a tab, tongue, projection or base portion 50 at the end of which is a downwardly projecting detent, tab, finger or projection 51 of lesser width than base portion 50. Detent 51 is sized to enter slot 52 in leaf spring or resilient latch 53 which is affixed, as by rivet 54, to the underside of lower member 31. Leaf spring 53 can be manually pressed downwardly by a member extending above the top surface of secondary yoke 31, such as button 55.

The described construction provides a detachable or disengageable connection between primary yoke 29 and secondary yokes 31 which operates in the following manner. The end of upper member 29 is pushed downwardly into opening aperture or slot 56 in the lower member 31, as shown by the arrow in FIGURE 13. Aperture 56 which is out of vertical alignment with slot 52, is large enough to permit the free entry of base portion 50 so that leaf spring 53 can be pressed downwardly by pressure on the end of upper member 29 until shoulders 45 rest on the upper surface of the sides 57 of aperture 56. Members 29 and 31 are manipulated so that the end of upper member 29 moves toward slot 52 in leaf spring 53 until detent 51 enters the slot. When this is accomplished, the leaf spring moves upwardly to hold or interlock member 29 and 31 together, as shown in FIGURES 12 and 14. Members 29 and 31 can be detached from each other by pressing downwardly upon button 55 until the leaf spring assumes the position shown by the dotted lines in FIGURE 12, whereupon the end of upper member 29 can be moved in the direction shown by the horizontal arrow in FIGURE 12 (i.e., toward the inner end of lower member 31) and withdraw from aperture 56.

The detachable connection between members 29 and 31 has the advantage that blade element 20 can be replaced when wiping edge 24 is worn out or distorted. In order to do this, members 29 and 31 are disconnected, as described above, and one of members 31 slid outwardly until it no longer engages wiper blade element 20. The wiper blade element than can be slid in the same direction until it no longer engages the other secondary yoke. A new wiper blade element is then inserted by reversing this process.

It is to be understood that sufficient play is provided in the described construction so that members 29 and 31 are in pivotal relation to each other. Because shoulders 45 rest firmly on the upper surface of member 31, the distance between members 29 and 31 remains constant at the point of connection. It will be understood by those skilled in the art, that the above described feature of the present invention can be used with pressure-distributing members having shapes other than the airfoil shape described.

In FIGURE 15 is shown another form of flexible support member or flexor, indicated generally at 58. Flexor 58 has side rails 59 bounding a central aperture 60 and joined to each other by U-shaped end portions 62, all of which are similar to and perform the same functions as side rails 27, central aperture 26 and end portions 28 of the flexor shown in FIGURE 4. Abutments, projections, tabs or detents 63 and 64 on side rails 59 are positioned, disposed or placed on side rails 59 inwardly (i.e, towards the longitudinal center of the blade) with respect to the inner ends 32 of lower members 31. Projections 63 and 64 are in abutting relation to the claws at the end of lower members adjacent thereto and prevent longitudinal displacement of pressure-distributing assembly 21. Flexors 58 may be advantageously formed from a strip of metal, as by die-cutting, which is as wide as the length of the flexor. During the forming process, projections 63 and 64 are cut or struck from material inwardly of the outer edges of adjacent flexors (i.e., adjacent flexors being the two flexors struck or cut from the strip or metal just prior to and just after the formation of flexor 58). Notches or indentations 65 and 66 are the result of forming projections on such adjacent flexors. Flexor 58 is thereby of constant width of metal, even though the outer edges of side rails 59 are not straight.

It will be noted in FIGURES 2, 4 and 5 that the portions 34 of the outer edges of flexor 28 that are formed downwardly out of the plane of the flexor, provide symmetrically disposed and directly opposed stops or abutments limiting the travel or secondary yokes 31 as they slide on the flexor. It is advantageous to turn down two abutments 34 at each position, one on each side of the flexor, as shown in FIGURE 4, because with a single abutment turned down on one side only of the flexor the impact against the abutment is one-sided and tends to bias the secondary yoke with relation to the flexor. With two abutments turned down to simultaneously receive the impact, such bias is minimized or eliminated. In FIGURE 15, projections 63 and 64 serve singly as abutments and therefore do not produce the advantages obtained from the form of flexor illustrated in FIGURES 2, 4 and 5.

Centrifugal force is one of the factors adding to the impact of the secondary yoke against any abutment means provided for limitation of its travel. This force is greatest when the windshield is lubricated by heavy rainfall and the blade is operated at maximum strokes per minute. Under such conditions the bias mentioned tends to increase undesirable noise in operation of the blade by causing maximum impact of the opposite end of the secondary yoke against the side of the flexor. Excessive or unnecessary noises created in the operation of a windshield wiper are regarded as undesirable in their effect upon the driver, and meet the disapproval of engineers of vehicle manufacturers charged with related responsibility.

It will be understood by those skilled in the art that features or elements of the windshield wiper shown in FIGURE 1 through 7, inclusive, and those of the windshield wiper shown in FIGURES 9 through 15, inclusive, may be interchanged or modified to suit various purposes and conditions. Thus, the flexor shown in FIGURES 2, 4 and 5 may be used with the pressure-distributing assembly shown in FIGURES 9 through 14, inclusive; or a blade may be constructed using the spacer means shown in FIGURES 2, 3 and 7 at one end of the primary member 29 and the detachable spacer means shown in FIGURES 10 through 14, inclusive at the other end of the primary member.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:

1. A windshield wiper assembly comprising a resilient flexible wiping blade element adapted to wipe a windshield, an arm-pressure distributing assembly adapted to receive pressure from a windshield wiper arm and transmit such pressure to said blade at a plurality of positions along its length, said pressure-distributing assembly comprising a plurality of elongate members pivotally connected to form an articulated structure with an outermost portion of an upper member overlying a portion of a lower member of less width than said upper member, said upper member being formed to constitute an airfoil shaped and disposed so that air currents exert aerodynamic pressure on said upper member downwardly toward the windshield, the upper face of said upper member defining a concave surface and the lower face of said upper member defining a convex surface, spacer means in fixed relation to one of said members and in pivotal relation to the other of said members to provide a pivotal connection between said upper and lower members and adapted to space apart said upper and lower members in a vertical plane common to the longitudinal axes of both of said members, the part of said spacer means between said upper and lower members having a sheet-like form lying substantially in a second plane approximately perpendicular to said vertical plane so as to present an edge to air flowing perpendicularly to said vertical plane and to provide a straight through passage for said air between the lower surface of said overlying portion and the top surface of said underlying portion during normal operation of the wiper assembly, said part of said spacer means between said upper and lower members having a width which is less than that of said upper member and not less than that of said lower member, and the intersection of said second plane with said convex surface being non-linear.

2. A windshield wiper assembly comprising a resilient flexible wiping blade element adapted to wipe a windshield, an arm-pressure distributing assembly adapted to receive pressure from a windshield wiper arm and transmit such pressure to said blade at a plurality of positions along its length, said pressure-distributing assembly comprising a plurality of elongate members pivotally connected to form an articulated structure with an upper member in overlying relation with a lower member, said upper member being formed of sheet material shaped and disposed to constitute an airfoil so that air currents exert aerodynamic pressure on said member downwardly toward the windshield, spacer means adapted to space apart said upper and lower members in a vertical plane common to the longitudinal axes of both of said members and formed by a down-turned end portion of said sheet material said lower member having upper and lower faces and an opening therethrough and the lower part of said down-turned end portion having shoulders pivotally engaging the upper surface of said lower member on opposite sides of said opening and an extension which extends through said opening and has a longitudinally projecting tongue positioned to engage the lower face of said lower member, and means on said lower member cooperating with said down-turned end portion to retain said tongue in said engaging position and thereby retain said upper and lower members in spaced articulated relation, the part of said down-turned end portion between said upper and lower members being flat and being disposed with its plane perpendicular to said vertical plane and providing an unobstructed space between the lower surface of said upper member and the top surface of said lower member.

3. A windshield wiper assembly comprising a resilient flexible wiping blade element adapted to wipe a windshield, an arm-pressure distributing assembly adapted to receive pressure from a windshield wiper arm and transmit such pressure to said blade at a plurality of positions along its length, said pressure-distributing assembly comprising a plurality of elongate members pivotally connected to form an articulated structure with an upper member in overlying relation with a lower member, said upper member being formed of sheet material shaped and disposed to constitute an airfoil so that air currents exert aerodynamic pressure on said member downwardly toward the windshield, spacer means adapted to space apart said upper and lower members in a vertical plane common to the longitudinal axes of both of said members and formed by a down-turned end portion of said sheet material, the lower part of said down-turned portion comprising an outwardly projecting tongue having a downwardly projecting detent thereon and said lower member being formed with an aperture therein adapted to permit entry of said tongue, and carrying a leaf spring below said aperture, said leaf spring having an opening therein outwardly positioned with respect to said aperture and adapted to receive said detent, and said lower member having means associated therewith for depressing said leaf spring, the part of said down-turned end portion between said upper and lower members being flat and being disposed with its plane perpendicular to said vertical plane and providing an unobstructed space between the lower surface of said upper member and the top surface of said lower member.

4. A windshield wiper assembly comprising a resilient flexible wiping blade element adapted to wipe a windshield, an arm-pressure distributing assembly adapted to receive pressure from a windshield wiper arm and transmit such pressure to said blade at a plurality of positions along its length, said pressure-distributing assembly comprising a plurality of elongate members pivotally connected to form an articulated structure with a portion of an upper member overlying at least a portion of a lower member, said upper member being formed to constitute an airfoil shaped and disposed so that air currents exert aerodynamic pressure on said member downwardly toward the windshield, spacer means in fixed relation to said upper member and in pivotal relation to said lower member and adapted to space apart said upper and lower members in a vertical plane common to the longitudinal axes of both of said members, said spacer means defining an end boundary for the space between said overlying and underlying portions and being shaped to offer minimum resistance to air moving laterally with respect to said vertical plane and providing, during normal operation of the wiper assembly, an unobstructed passage for air flowing through the space between said overlying and underlying portions said lower member having upper and lower faces and an opening therethrough and said spacer means having a width of the order of magnitude of that of said lower member and a reduced portion defining shoulders engaging the upper face of said lower member and a tongue extending through said opening, and manually releasable latch means cooperating with said tongue to retain said tongue in said opening and thereby retain said upper and lower members in spaced articulated relation.

5. A windshield wiper assembly comprising a resilient flexible wiping blade having an edge adapted to contact a windshield to wipe it, an arm-pressure distributing assembly adapted to receive pressure from a windshield wiper arm and transmit such pressure to said blade at a plurality of positions along its length, said pressure-distributing assembly comprising a plurality of elongate members, said members being pivotally connected to form an articulated structure with a portion of an upper member overlying at least a portion of a lower member, a spacer element in fixed relation to said upper member and in pivotal relation to said lower member and spacing apart said upper and lower members in a plane common to the longitudinal axes of both said members, said spacer element being disposed adjacent an end of said upper member and having its maximal surface area disposed substantially transverse to the vertical plane of the longitudinal axes of said members and permitting articulation therebetween substantially in a plane of their respective longitudinal axes, said spacer element being dimensionally adapted to dispose the lower surface of said upper member sufficiently above and spaced away from said wiping blade and from the upper surface of said lower member to permit relatively free movement of air therebetween, said lower member having upper and lower faces and an opening therethrough and said spacer element having a wider upper portion and a reduced lower portion to define shoulders engaging the upper face of said lower member and a tongue extending through said opening and having a horizontally projecting portion engageable with the lower face of said lower member to retain said tongue in said opening and thereby retain said upper and lower members in spaced articulated relation, and manually releasable latch means for retaining said horizontally projecting portion in engagement with said lower face of said lower member.

6. A windshield wiper comprising a resilient flexible wiping blade element adapted to wipe a windshield, an arm-pressure distributing assembly adapted to receive pressure from a windshield wiper arm and transmit such pressure to said blade element at a plurality of positions along its length, said pressure-distributing assembly comprising a plurality of elongate members pivotally connected to form an articulated structure, one of said members having at least one portion adjacent an end thereof comprising an outwardly projecting tongue having a downwardly projecting detent thereon, a second member of said pressure-distributing assembly being formed with an aperture therein adapted to permit entry of said outwardly projecting tongue, resilient latch means below said aperture carried by said second member, said latch means having an opening therein out of vertical alignment with said aperture and adapted to receive said downwardly projecting detent and to interlock therewith, and means for manually manipulating said resilient latch to disengage said members.

7. A windshield wiper comprising a resilient flexible wiping blade element adapted to wipe a windshield, an arm-pressure distributing assembly adapted to receive pressure from a windshield wiper arm and transmit such pressure to said blade element at a plurality of positions along its length, said pressure-distributing assembly comprising a plurality of elongate members pivotally connected to form an articulated structure, an upper member of said pressure-distributing assembly having a downwardly projecting element adjacent an end thereof, said element having an upper portion having shoulders on each side at the bottom thereof and a lower portion carrying a horizontally projecting tongue having a detent thereon, a second member of said pressure-distributing assembly being formed with an aperture in the top thereof adapted to permit entry of said horizontally projecting tongue, resilient latch means below said aperture carried by said second member, said latch means having means adapted to receive said detent and to interlock therewith with the shoulders of the upper portion of said downwardly projecting element resting on the respective side walls of said aperture, and means for manually manipulating said resilient latch to disengage said members.

8. In a windshield wiper assembly comprising a resilient flexible wiping blade element having a flexible support member and a resilient wiping member engaged with said support member and having an edge adapted to contact a windshield to wipe it, an arm-pressure distributing assembly adapted to receive pressure from a windshield wiper arm and transmit such pressure to said blade element at a plurality of positions along its length, said pressure-distributing assembly comprising upper and lower elongate members pivotally connected to form an articulated structure, at least one of said lower members being detachably connected to the upper member, all of the lower members having, at the ends thereof, claw means for slidably embracing said support member adjacent the ends of said support member and at intermediate positions spaced inwardly from opposite ends of said support member, said support member comprising a strip of metal having at locations adjacent and inwardly of said intermediate positions portions partially severed from said strip and displaced out of alignment with said strip to act as abutments with respect to said claw members, said displaced portions being engageable by said claw means so as to prevent disengagement of the blade element and the pressure-distributing assembly when the latter is assembled and allowing disengagement when said upper and lower members are detached from each other, the partial severance of said portions providing at said locations resilient weakened portions of greater flexibility than the rest of said strip, said weakened portions dividing said support member into a plurality of sections connected by portions of greater flexibility to provide resilient articulation of said support member facilitating conformation of said blade element to a curved windshield.

9. An arm-pressure distributing assembly for a windshield wiper, said arm-pressure distributing assembly being adapted to receive pressure from a windshield wiper arm and transmit such pressure to a resilient flexible blade element at a plurality of positions along its length and comprising a plurality of elongate members pivotally connected to form an articulated structure with an upper member in overlying relation with lower members, said upper member being shaped and disposed to constitute an airfoil so that air current exert aerodynamic pressure on said member downwardly toward the windshield, downwardly projecting portions adjacent each end of said upper member adapted to space apart said upper and lower members in a vertical plane common to the lonigtudinal axes of both of said members, the lower part of each downwardly projecting portion being pivotally connected to said lower member, the part of each downwardly projecting portion between said upper and lower members being flat and being disposed with its plane perpendicular to said vertical plane and providing straight through passage between the lower surface of said upper member and the top surfaces of said lower members, the lower part of at least one downwardly projecting portion comprising an outwardly projecting tongue having a detent thereon, the lower member pivotally connected thereto being formed with an aperture therein adapted to permit entry of said tongue and carrying a leaf spring below said aperture, said leaf spring having an opening therein outwardly positioned with respect to said aperture and adapted to receive said detent, and means for depressing said leaf spring.

10. A windshield wiper assembly comprising a resilient flexible wiping blade element having a flexible support member and a resilient wiping member engaged with said support member and having an edge adapted to contact a windshield to wipe it, an arm-pressure distributing assembly adapted to receive pressure from a windshield wiper arm and transmit such pressure to said blade element, said pressure-distributing assembly comprising elongate members pivotally connected together to form an articulated structure and having claw means for embracing said support member adjacent the ends of said support member and at intermediate locations spaced along its length, said support member having local weakened portions positioned adjacent said intermediate locations embraced by said claw means and inwardly toward the middle of the support member with respect to said intermediate locations, each of said weakened portions being formed by a pair of spaced cuts in each of the opposite edges of said support member to provide a small flap between the cuts of a pair, said flaps being bent transversely out of alignment with said support member, said weakened portions dividing said support member into a plurality of sections connected by said weakened portions, which provide increased flexibility between said sections so as to facilitate conformation of said blade element to a curved windshield when said support member is flexed by the application of pressure to said support member by said claw means, said flaps providing abutments for engagement by adjacent claw means for positioning said blade element relative to said pressure-distributing assembly.

11. A resilient flexible wiping blade element having a flexible support member of uniform width and a resilient wiping member engaged with said support member and having an edge adapted to contact a windshield to wipe it, said support member having local weakened portions at intermediate positions spaced inwardly from opposite ends of the support member toward the middle of the support member, each of said weakened portions being formed by a pair of spaced cuts at opposite positions in each of the opposite edges of said support member to provide a small flap between the cuts of a pair, said flaps being bent out of alignment with said support member, said weakened portions dividing the support member into three sections interconnected by said weakened portions which provide increased flexibility between said sections so as to facilitate conformation of said blade element to a curved windshield when said support member is flexed by the application of pressure to said support member, said blade element being for use as a refill for a windshield wiper blade assembly and said flaps providing abutments for engagement by adjacent claw means of an arm-pressure distributing assembly for positioning said blade element relative to said pressure-distributing assembly.

References Cited
UNITED STATES PATENTS

| | | | |
|---|---|---|---|
| 2,897,530 | 8/1959 | Anderson | 15—250.42 |
| 2,924,840 | 2/1960 | Anderson | 15—250.42 |
| 3,107,384 | 10/1963 | Wise | 15—250.42 |

FOREIGN PATENTS

| | | |
|---|---|---|
| 882,780 | 11/1961 | Great Britain. |
| 1,328,616 | 4/1963 | France. |

CHARLES A. WILLMUTH, *Primary Examiner.*

UNITED STATES PATENT OFFICE

CERTIFICATE OF CORRECTION

Patent No. 3,350,738                                November 7, 1967

John W. Anderson

It is hereby certified that error appears in the above numbered patent requiring correction and that the said Letters Patent should read as corrected below.

Column 2, line 35, for "flexor or" read -- flexor of --; column 4, line 30, for "29, or" read -- 39, of --; column 6, line 25, for "travel or" read -- travel of --; column 10, line 30, for "lonigtudinal" read -- longitudinal --.

Signed and sealed this 3rd day of December 1968.

(SEAL)
Attest:

Edward M. Fletcher, Jr.                          EDWARD J. BRENNER
Attesting Officer                                    Commissioner of Patents